(12) United States Patent
Cromer et al.

(10) Patent No.: US 7,864,670 B2
(45) Date of Patent: *Jan. 4, 2011

(54) DYNAMIC CABLE ASSIGNMENT ON GIGABIT INFRASTRUCTURE

(75) Inventors: Daryl Carvis Cromer, Cary, NC (US); Howard Jeffrey Locker, Cary, NC (US); Marc Richard Pamley, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 360 days.

This patent is subject to a terminal disclaimer.

(21) Appl. No.: 11/763,196

(22) Filed: Jun. 14, 2007

(65) Prior Publication Data

US 2007/0237166 A1    Oct. 11, 2007

Related U.S. Application Data

(63) Continuation of application No. 10/320,885, filed on Dec. 17, 2002, now Pat. No. 7,535,830.

(51) Int. Cl.
*G01R 31/08* (2006.01)
*H04J 3/16* (2006.01)
*G06F 11/00* (2006.01)

(52) U.S. Cl. .......................... 370/225; 370/465; 714/43

(58) Field of Classification Search ................. 370/216, 370/225–227, 463–465; 709/239; 714/37, 714/43, 56, 820–821
See application file for complete search history.

(56) References Cited

U.S. PATENT DOCUMENTS

| | | | |
|---|---|---|---|
| 4,551,671 A | 11/1985 | Annunziata et al. | |
| 5,315,597 A | 5/1994 | Yang et al. | |
| 5,485,465 A | 1/1996 | Liu et al. | |
| 5,488,306 A | 1/1996 | Bonaccio | |

(Continued)

OTHER PUBLICATIONS

Kamran Azadet; Gigabit Ethernet Over Unshielded Twisted Pair Cables; International Symposium On VLSI Technology, Systems, and Applications; 1999; Jun. 8-10, 1999; pp. 167-170; DSP and VLSI Systems Research Department; Bell Laboratories; Lucent Technologies; Holmdel, NJ 07733; USA.

(Continued)

*Primary Examiner*—Warner Wong
(74) *Attorney, Agent, or Firm*—Brandon C. Kennedy; Cynthia G. Seal; Biggers & Ohanian, LLP

(57) ABSTRACT

A method and corresponding network interface device for communicating between devices connected to a LAN includes attempting to communicate between the network devices over an initial subset of the network media wires. If the communication fails, a subsequent subset of media wires is selected. The wires of this subsequent subset differ from the wires of the initial subset. If the attempted communication succeeds, the current subset of network media wires is used as the media over which subsequent network data is transmitted. Attempting to communicate over the media may include sending an initialization sequence such as an Ethernet Autonegotiate sequence. In one embodiment, the network media is implemented as 8 wires of CAT 5 cabling suitable for use with a Gigabit Ethernet. In this embodiment, any subsequent subsets of the network media wires may consist of 4 of the 8 wires over which 100 Mbps Ethernet operation may occur.

22 Claims, 3 Drawing Sheets

U.S. PATENT DOCUMENTS

| | | | |
|---|---|---|---|
| 5,721,820 A * | 2/1998 | Abali et al. ................. 709/243 |
| 5,768,301 A | 6/1998 | Dreyer et al. |
| 6,061,742 A * | 5/2000 | Stewart et al. ............. 709/250 |
| 6,169,475 B1 | 1/2001 | Browning |
| 6,411,506 B1 * | 6/2002 | Hipp et al. ............. 361/679.41 |
| 6,654,923 B1 | 11/2003 | Grenier et al. |
| 6,763,479 B1 * | 7/2004 | Hebert ......................... 714/4 |
| 7,197,548 B1 | 3/2007 | Ptasinski et al. |
| 2001/0028704 A1 * | 10/2001 | Goodman ................ 379/93.01 |
| 2002/0046357 A1 | 4/2002 | Huang et al. |
| 2002/0114332 A1 | 8/2002 | Apostolopoulos et al. |
| 2004/0267980 A1 | 12/2004 | McBrearty et al. |

OTHER PUBLICATIONS

DR Cecchi, RL Donze; Driver With In-Situ Variable Compensation For Cable Attenuation; IBM Dossier ROC919980215; 09829/1998; pp. 1-5.

T. Dung, et al.; A Circuit An Method Capable Of Automatically Detecting An Switching For Transmitting And Receiving Data On Network Twist-Pair Wire Without Using MDI Adapter Or Switch And Thus Reduce Manufacturing An Assembly Cost; Thomson Derwent; 2002; p. 1.

* cited by examiner

DYNAMIC CABLE ASSIGNMENT ON GIGABIT INFRASTRUCTURE

CROSS-REFERENCE TO RELATED APPLICATION

This application is a continuation application of and claims priority from U.S. patent application Ser. No. 10/320,885, filed on Dec. 17, 2002.

BACKGROUND

1. Field of the Present Invention

The present invention generally relates to the field of data processing networks and more particularly to Ethernet networks employing twisted pair cabling such as CAT 5, CAT 5e, and CAT 6 cabling.

2. History of Related Art

In the field of data processing local area networks (LANs), the transistor from 10/100 Megabits/second (Mbps) systems to 1000 Mbps (Gigabit) systems is well underway. The installed base of 10/100 Ethernet systems was largely implemented with Category 5 (CAT 5), twisted pair cabling as specified by ANSI/EIA (American National Standards Institute/Electronic Industries Association) Standard 568. Standard 568 specifies the cable material as well as the types of connectors and junction blocks to be used in order to guarantee the data rate associated with the category. Originally, 100 Mbps Ethernet systems used 4 twisted pairs (8 wires) of which 4 wires were terminated to ground. More recently, 100 Mbps Ethernet typically employ improved drivers that eliminate the need for the 4 ground wires. Gigabit Ethernet can also be installed on CAT 5 systems having 4 twisted-pairs although all 8 wires are needed. Thus, at the physical layer, there is substantially no difference between Gigabit Ethernet systems employing CAT 5 cabling and many 100 Mbps systems. It would be desirable to implement an Ethernet system that took advantage of this hardware commonality to improve the availability or reliability of Gigabit installations.

SUMMARY OF THE INVENTION

The problems identified above are in large part addressed by a method and corresponding network interface device for communicating between devices connected to a LAN. The novel method includes attempting to communicate between the network devices over an initial subset of the network media wires. If the communication fails, a subsequent subset of media wires is selected. The wires of this subsequent subset differ from the wires of initial subset. If the attempted communication succeeds, the current subset of network media wires is used as the media over which subsequent network data is transmitted. Attempting to communicate over the media may include sending an initialization sequence such as an Ethernet Auto-negotiate sequence. In one embodiment, the network media is implemented as 8 wires of CAT 5 cabling suitable for use with a Gigabit Ethernet LAN. In this embodiment, any subsequent subsets of the network media wires may consists of 4 of the 8 wires over which 100 Mbps Ethernet operation may occur.

A network interface device according to the present invention may include a processor having access to random access memory (RAM) and read only storage (ROS) and configured to produce a set of processor signals. A host interface unit (HIFU) of the network interface device includes buffers and logic enabling communication with the host device. A media interface unit (MIFU) receives the set of processor signals and produces a resulting set of output signals that are provided to a LAN media. The network interface device is enabled to reroute at least a portion of the processor signals upon determining that communication over the media has failed. The rerouting causes a subset of the MIFU output signals to be provided to a functional subset of media wires. In one embodiment, the network interface device is a Gigabit Ethernet network device configured to use 8 wires of a CAT 5 media. In this embodiment, the network interface device is configured, upon determining that the communication has failed, to reroute the processor signals to a subset of 4 functional wires and to operate as a 100 Mbps network interface device using these 4 wires thereby providing network communication functionality in the face of a partial network media failure.

BRIEF DESCRIPTION OF THE DRAWINGS

Other objects and advantages of the invention will become apparent upon reading the following detailed description and upon reference to the accompanying drawings in which.

Figure 1:
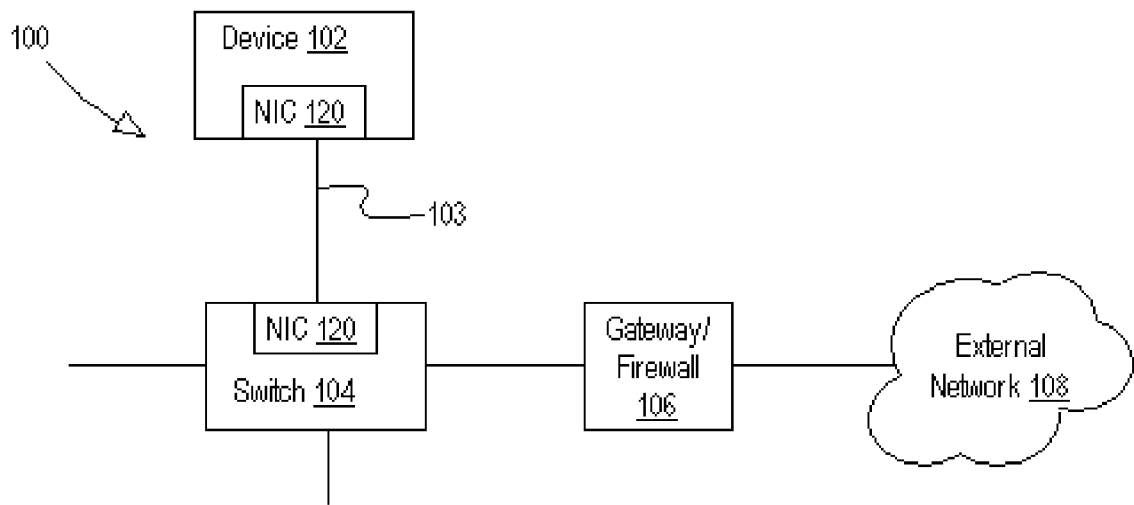
FIG. 1 is a block diagram of selected elements of a network according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates the ability to improve reliability and availability of a network such as an Ethernet LAN by detecting when one or more of the signal cables within the network's physical media is defective and rerouting signals to take advantage of unused signals. If the system suspects that a signal wire is defective, the signal corresponding to the defective wire is re-routed to an available wire. In this manner, the invention contemplates a network interface device employing the concept of a logical signal that is not necessarily tied to a particular physical wire within the media. If the system incorporates the ability to operate in an environment that does not require all of the media's signal wires, the system can maintain availability if one or more of the wires becomes defective by using available and functioning wires within the media to implement the physical media. If, for example, a particular LAN is a CAT 5, Gigabit enabled system employing 4 twisted-pairs of signal cables and one of the signal cables becomes defective, the system could transition to a 2 twisted pair compatible environment, such as a 100 Mbps system, by logically routing one of the 100 Mbps signals to one of the four wires that represent "spares" in a 100 Mbps system. In this manner, the invention facilitates communication between devices on a network by attempting initially to communicate over a first subset of wires within the media. If the initial communication fails, a subsequent subset of wires (different than the initial subset of wires) is selected to implement the media and a subsequent communication is attempted. If this subsequent communication succeeds, the currently selected subset of wires is then used as the network media over which network data can be transmitted between the network devices. If the subsequent communication fails, a new subset of wires is chosen and tried. This process is repeated until the communication is successful or until there are no more suitable subsets of wires over which the communication can be attempted, in which case an interrupt is issued.

Turning now to the drawings, FIG. 1 is a simplified block diagram of selected components of the data processing network 100 according to one embodiment of the present invention. In the depicted embodiment, network 100 is an example of a LAN in which one or more data processing devices 102 are connected to a switch 104. Data processing device 102 may include servers, storage devices, desktop machines, network computers, data terminals, and the like. Switch 104 may comprise a router or the like to which multiple devices 102 are connected.

Network 100 employs a physical medium 103 to connect device(s) 102 to switch 104. In the preferred embodiment of the invention, physical medium 103 includes 4-pair (8 wire) CAT 5 cabling suitable for use in 1000, 100, and 10 Mbps Ethernet systems as specified in IEEE 802.3. Such systems include 10BaseT4, 100BaseT4, and Gigabit Ethernet systems.

The depicted embodiment of network 100 includes a gateway and firewall unit 106 that connected to switch 104. Unit 106 is suitable for connecting network 100 to an external network 108 such as the Internet. Although unit 106 is illustrated as a single unit, it will be appreciated that unit 106 may include two or more physically distinct devices.

Device 102 and switch 104 are both depicted as including a network interface device (referred to herein as a NIC) 120. NIC 120 may be implemented as an adapter card that connects to a processing board or motherboard. Alternatively, NIC 120 may be integrated onto the motherboard or integrated within a processor itself. NIC 120 is configured to enable a processor on the corresponding device to communicate with external devices over the physical medium 103.

Figure 2:
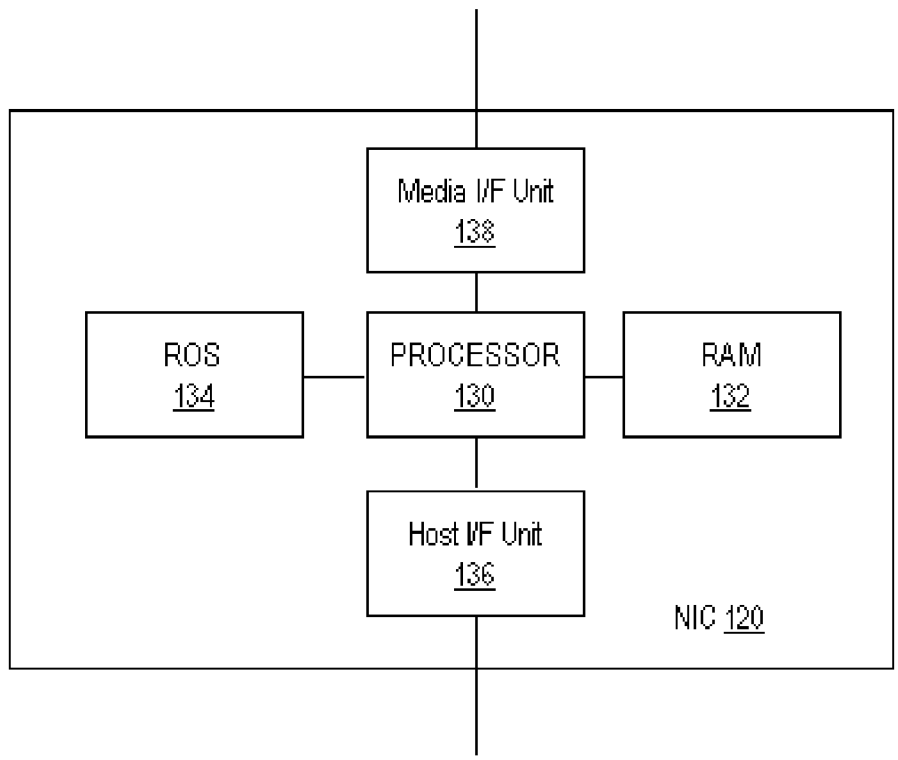
FIG. 2 is a block diagram of selected elements of a network interface card suitable for use in the network of FIG. 1.

Referring now to FIG. 2, selected elements of a NIC 120 according to the present invention are shown to emphasize features of the invention. NIC 120 is suitable for use as the network interface for device 102 and switch 104. Although the network interface for device 102 and switch 104 may have unique elements, the elements depicted in FIG. 2 are common to each and are sufficient to enable NIC 120 to communicate information between the host (device 102 or switch 104) in accordance with the teachings of the present invention. NIC 120 includes hardware, software, or a combination of the two, that enables the NIC to convert digital information to a set of signals suitable for transmission over medium 103.

In the depicted embodiment, NIC 120 includes a processor 130, random access memory (RAM) 132, Read-only storage (ROS) 134, a host interface unit (HIFU) 136, and a media interface unit (MIFU) 138. Processor 130 is likely implemented with an embedded controller such as a Series 403 PowerPC® embedded controller from IBM Corporation. Alternatively, processor 130 could be implemented with a general purpose CISC or RISC processor or DSP processor. It is also possible that NIC 120 could be embedded within a single chip that integrates any or all of processor 130, RAM 132, ROS 134, HIFU 136, and MIFU 138. RAM 132 is connected to processor 130 and provides a scratch memory area for the processor. ROS 134 is typically programmed or manufactured to store a sequence or sequences of instructions executable by processor 130. The HIFU 136 typically includes buffers and associated logic that enables NIC 120 to communicate with its host, whether it is device 102, switch 104, or another host.

The depicted embodiment of MIFU 138 is configured to receive digital information provided by processor 130 and to convert or format the corresponding information for transmission over the network media 103. In an Ethernet embodiment of network 100, the physical layer includes various sublayers that are implemented within NIC 120 and MIFU 138. Eight bit data chunks referred to as frames are transmitted from a media access control (MAC) layer, to a physical coding sublayer (PCS) through a Gigabit Media Independent Interface (GMII). MIFU 138 converts the information received from the GMII into signals suitable for transmission over media 103. In one implementation, MIFU 138 employs a Pulse Amplitude Modulation 5 (PAM 5) to encode the frames. PAM 5 encoding resolves each of the media wires into one of five data levels (−1.0, −0.5, 0, 0.5, and 1.0) enabling the encoding of a large number of signals. In a four wire media, for example, PAM 5 encoding enables the generation of $5^4$ or 625 potential codes, which is more than sufficient to encode 8-bit frames.

In one embodiment, processor 130 generates processor signals that are provided to the wires in media 103 through the intervening MIFU 138. The signals produced on media 103 reflect the correspondence between the processor signals, the signals output from MIFU 138, and physical media signal wires. If a device 102 within the system determines that its connection is non-functional, NIC 120 may logically re-route its outputs by altering the correspondence between the processor signals and physical media wires. If NIC 120 is able to find a minimum number of functional signal wires in media 103, NIC 120 may reroute the signals it produces to the functional signal wires thereby enabling the system to continue operation, even if at a reduced data rate.

Figure 3:
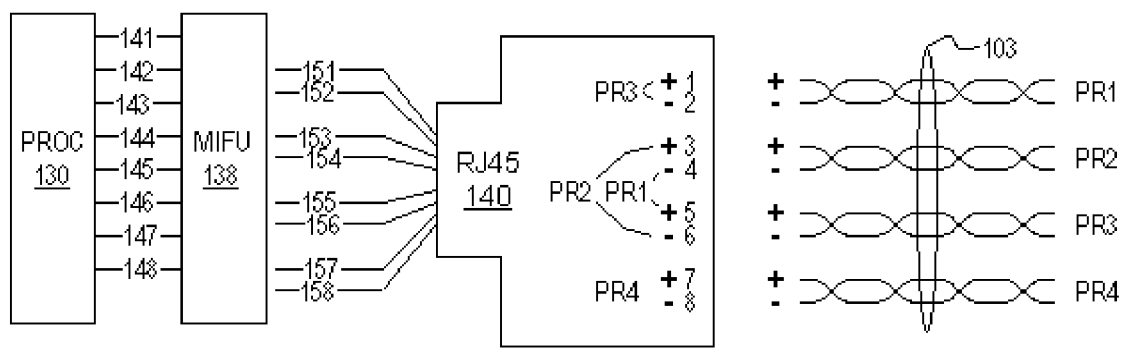
FIG. 3 is a diagram of selected elements of a network according to one embodiment of the invention.
Figure 4:
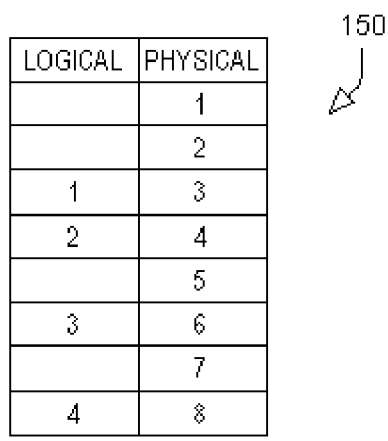
FIG. 4 is a conceptual depiction of a table suitable for use in a NIC employing logical signal re-routing according to one embodiment of the invention.

Referring now to FIG. 3 and FIG. 4, selected elements of the network 100 are shown to emphasize aspects of the invention. In the illustration, network media 103 is shown as including 8 wires configured as 4 twisted pairs identified as PR 1, PR 2, PR 3, and PR 4. These eight wires are commonly terminated at a suitable connector such as the depicted RJ 45 connector 140. Connector 140 receives its eight signals from the eight signals 151-158 produced by MIFU 138. MIFU 138 generates signals 151-158 based upon the state of eight signals 141-148 (processor signals) produced by processor 130. One embodiment of NIC 120 maintains a table 150 in RAM 132 that defines the correspondence between logical output pins and physical output pins of processor 130. Table 150 may also be implemented with a special or general purpose register. Processor 130 includes the ability to produce any possible correspondence between its logical pins such that any logical pins may be assigned to any physical pin. If NIC 120 determines that one or more signal wires in media 103 is non-functional, NIC 120 may reconfigure the logical to physical pin correspondence to re-route signals to a set of functional signal wires in media 103.

Portions of the invention may be implemented as a set of computer executable instructions (software). The software may be stored on a computer readable medium, including, in this example, ROS 134 and RAM 132 of NIC 120. ROS 134 may be implemented with a ROM, flash memory device, or any other suitable non-volatile storage device. RAM 132 is typically implemented with one or more DRAM modules.

Figure 5:
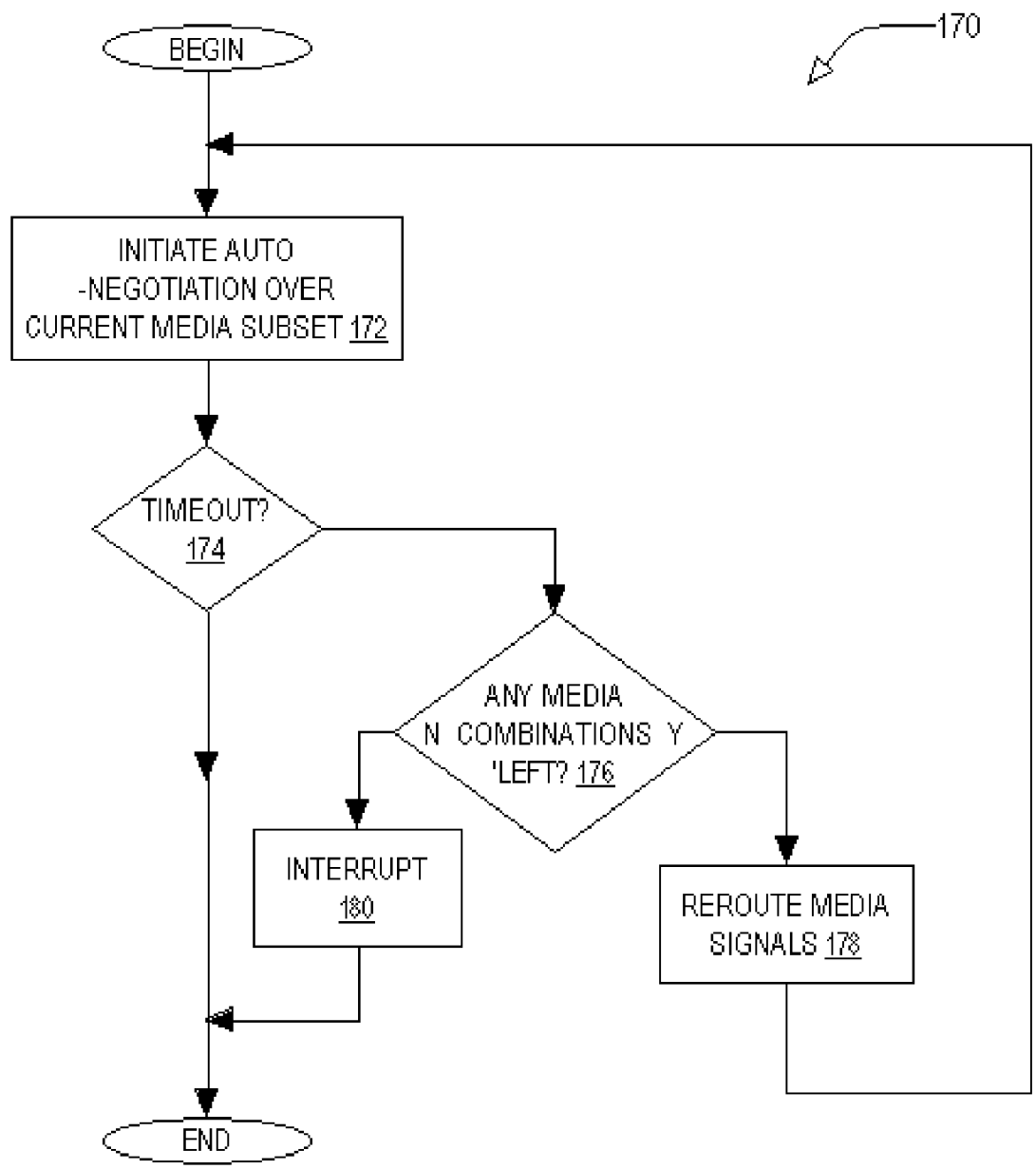
FIG. 5 is a flow diagram of a method of configuring a network media according to one embodiment of the invention.

Referring now to FIG. 5, a flow diagram illustrating a method 170 of implementing a network media according to one embodiment of the invention is presented. Initially, an attempt to communicate between network devices is made by first sending some form of initialization sequence over the network media over an initial subset of wires within the media. In the depicted embodiment, the initialization sequence includes an Ethernet Auto-negotiation sequence as indicated in block 172. Most Ethernet 100 Mbps adapters and all Ethernet Gig Adapters incorporate an Auto-negotiation feature that enables the adapter to communicate with slower (10 Mbps) adapters. Auto-negotiation is defined in Clause 28 of the 1998 edition of IEEE Standard (Std) 802.3. During an Ethernet Auto-negotiation sequence, two devices determine the highest level of service at which both ends of the connection can operate. The levels of services are prioritized according to a predetermined definition. Initially, both ends of the connection configure themselves according to the lowest priority level of service (typically 10BaseT). The systems then attempt to negotiate for a mutually attainable higher level of service using the Auto-negotiation procedure.

One embodiment of the present invention leverages the Auto-negotiation functionality of the large installed base of Ethernet adapters to determine if network media 103 is functional. If media 103 is determined to be non-functional, the invention attempts to maintain network functionality by re-routing signals to a functional set of wires. More specifically, one embodiment of the invention relies on the Fast Link Pulse (FLP) generated by Ethernet adapters at the start of the Auto-negotiation process to verify the integrity of the media.

Fast Link Pulse (FLP) signals are a modified version of the Normal Link Pulse (NLP) signals used for verifying link integrity, as defined in the original 10BaseT specifications. FLP signals are generated automatically at power-up, or may be selected manually through a management interface to an Auto-negotiation device such as NIC 120. Like the original NLP, FLP signals take place during idle times on the network link and do not interfere with normal traffic. FLP signals are conventionally used to send information about device capabilities. The Auto-negotiation protocol contains rules for device configuration based on this information that enables the NICs 120 in switch 104 and device 102 to automatically negotiate and configure themselves to use the highest level of service.

Because Auto-negotiation was originally specified for 100 Mbps adapters that may have been installed on 2 pair cabling systems, the FLP signals are restricted to 2-pairs of wires even on systems (such as Gigabit systems) employing 4 pair cabling. If one of the four wires in the 2 pairs used to send the FLP signals is non-functional (open, shorted to ground, shorted to Vdd, and so forth), the Auto-negotiation will not complete successfully. To detect and respond to this condition, the depicted embodiment of the present invention monitors for a timeout condition (block 174) after initiating the Auto-negotiation sequence.

If a time out is detected in block 174, the present invention assumes that one of the four original FLP wires is non-functional. In response to this determination, the depicted embodiment of method 170 then sequences through the set of possible logical/physical pin permutations until a setting is detected that results in the successful transmission of the FLP signals. More specifically, upon detecting a timeout condition in block 174, method 170 then determines (block 176) whether all of the possible media configurations or subsets have been exhausted. If not, NIC 120 reroutes (block 178) its logical-to-physical pin assignments to the next logically sequential combination and re-initiates the Auto-negotiation process (block 178). If a timeout occurs using the newest combination, the next logically sequential combination is attempted and so forth until all combinations have been attempted. If all combinations of logical/physical pin assignments have used without successfully resulting in the transmission of an FLP, an interrupt is issued (block 180) and the process terminates with a fatal error condition. If a timeout does not occur, implying that the Auto-negotiation sequence completed successfully, the network link is established at the negotiated level of service using the physical signal wires that were determined to be functional. In this manner, the invention enables any connection employing 4-pair CAT 5 wiring to continue operation at speeds of up to 100 Mbps even if 50% of the media's signal wires are non-functional. This elegant solution thus provides a significant level of fault tolerance into the network at a minimal cost.

The process of using different logical/physical pin combinations as described above effectively re-routes the FLP signals onto different combinations of wires within media 103. If any four of the wires in media 103 are functional, the FLP handshake sequence will eventually complete normally. In one embodiment, the switch 104 is configured as the receiver of the FLP signals while the device 102 is the sender. Switch 104 may be configured to read all 8 wires. In a typical implementation, the wires in media 103 are tied to a voltage source (Vss or Vdd) through a high impedance element such as a suitable resistor. In such an implementation, an open or otherwise floating wire in media 103 will be tied to a static voltage level. Since the FLP signals "wiggle" each of the corresponding signal wires, it will be apparent to switch 104 which wire(s) are bad. Upon discovering 4 functional wires, the switch can re-route the 4 active bits onto the four functional wires. All subsequent packet transfers can then occur over the 4 functioning wires.

It will be apparent to those skilled in the art having the benefit of this disclosure that the present invention contemplates a method and system for using and configuring a network media. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of communicating between first and second devices connected by a network media cable, wherein the network media cable comprises a set of network media wires, the method comprising:

attempting, by a network interface device, to communicate between the first and second network devices over a current subset of the network media wires of the network media cable;

responsive to determining that the attempted communication failed;

selecting, by the network interface device, a subsequent subset of network media wires of the network media cable, wherein the network media wires within said subsequent subset and said current subset differ in at least one element; and using, by the network interface device, at least the selected subsequent subset of network media wires as the media over which subsequent network data is transmitted between the first and second devices; and responsive to determining that the attempted communication succeeded, using, by the network interface device, at least the current subset of network media wires as the media over which subsequent network data is transmitted between the first and second devices.

2. The method of claim 1, wherein attempting to communicate over a network media comprises sending an initialization sequence responsive to connecting the first and second devices to the network media.

3. The method of claim 2, wherein sending an initialization sequence comprises initiating an Auto-negotiation sequence between the network devices.

4. The method of claim 1, wherein the network media comprises 8 wires of CAT 5 cabling and wherein the current and any subsequent subsets of the network media wires consists of 4 of the 8 wires.

5. The method of claim 1, wherein determining that the attempted communication failed comprises determining that a predetermined time period has elapsed.

6. The method of claim 1, wherein using the current subset of network media wires further comprises, responsive to successfully communicating between devices on a first attempt, using all of the network media wires as the media over which subsequent network data is transmitted.

7. The method of claim 6, further comprising, responsive to determining that transmission of network data over all of the media wires is unsuccessful, selecting the current subset of network media wires as the network medium.

8. A network interface device suitable for connecting a host device to a local area network (LAN), comprising:
   a processor having access to random access memory (RAM) and read only storage (ROS) and configured to produce a set of processor signals;
   a host interface unit (HIFU) including buffers and logic enabling communication with the host device;
   a media interface unit (MIFU) configured to receive the set of processor signals and to produce a set of output signals based thereon that are provided to a LAN media; and
   means for rerouting at least a portion of the processor signals, responsive to determining that communication over the media has failed, wherein the rerouting causes a subset of the MIFU output signals to be provided to a functional subset of media wires of a network media cable.

9. The network interface device of claim 8, further comprising means for sending an initialization sequence over at least a subset of the wires in the media.

10. The network interface device of claim 9, wherein the means for sending the initialization sequence comprises means for initiating an Auto-negotiation sequence between the network devices.

11. The network interface device of claim 8, wherein the network media comprises 8 wires of CAT 5 cabling and wherein the functional subset of wires consists of 4 of the 8 wires.

12. The network interface device of claim 8, wherein determining that the communication failed comprises determining that a predetermined time period has elapsed without successful completion of a communication.

13. The network interface device of claim 8, wherein responsive to successfully communicating over the media on a first attempt, the network interface is further configured to use all of the network media wires as the media over which subsequent network data is transmitted.

14. The network interface device of claim 13, wherein the network interface device is further characterized as a Gigabit Ethernet network interface device.

15. The network interface device of claim 14, wherein upon determining that the communication failed, the network interface device reroutes the processor signals to a subset of 4 wires and the network interface device operates as a 100 Mbps network interface device.

16. A network interface device suitable for connecting a data processing system to a local area network (LAN), comprising:
   a processor and logic to cause the processor to carry out the steps of:
   attempting to communicate with another device connected to the LAN over a current subset of the network media wires of a network media cable;
   determining that the attempted communication failed and, responsive thereto, selecting a subsequent subset of media wires wherein the network media wires within said subsequent subset and said current subset differ in at least one element; and
   determining that the attempted communication succeeded and, responsive thereto, using at least the current subset of network media wires as the media over which subsequent network data is transmitted between the first and second devices.

17. The network interface device of claim 16, wherein attempting to communicate over a network media further comprises sending an initialization sequence responsive to connecting the first and second devices to the network media.

18. The network interface device of claim 17, wherein sending an initialization sequence further comprises initiating an Auto-negotiation sequence between the network devices.

19. The network interface device of claim 16, wherein the network media comprises 8 wires and wherein the current and any subsequent subsets of the network media wires consists of 4 wires.

20. The network interface device of claim 16, wherein determining that the attempted communication failed further comprises determining that a predetermined time period has elapsed.

21. The network interface device of claim 16, wherein using the current subset of network media wires further comprises, responsive to successfully communicating between devices on a first attempt, using all of the network media wires as the media over which subsequent network data is transmitted.

22. The network interface device of claim 21, further comprising media interface unit logic capable of selecting the current subset of network media wires as the network medium responsive to determining that transmission of network data over all of the media wires is unsuccessful.

* * * * *